Figure 1:
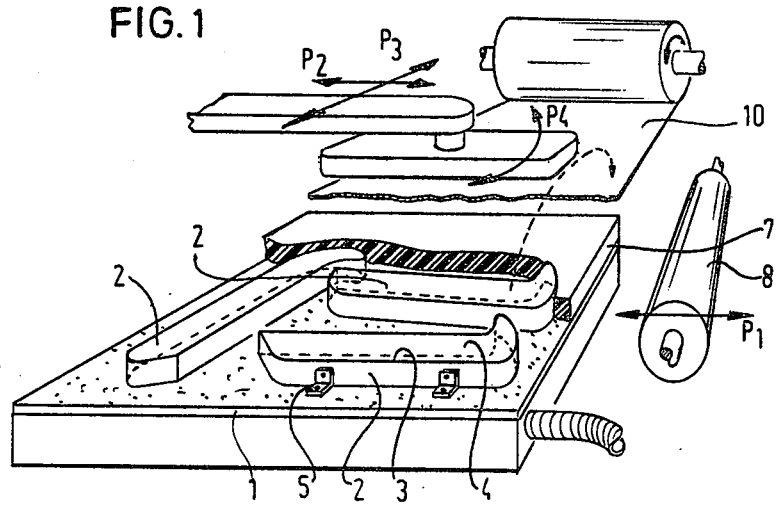

United States Patent [19]

Boogers

[11] Patent Number: 4,480,507
[45] Date of Patent: Nov. 6, 1984

[54] METHOD FOR MANUFACTURING A PUNCHING UNIT

[75] Inventor: Wilhelmus P. L. Boogers, Eindhoven, Netherlands

[73] Assignee: P.M.B. Patent Machinebouw, B.V., Best, Netherlands

[21] Appl. No.: 350,768

[22] Filed: Feb. 22, 1982

[30] Foreign Application Priority Data

Feb. 20, 1981 [NL] Netherlands ........................ 8100858

[51] Int. Cl.³ .......................... B21D 37/20; A24B 7/00
[52] U.S. Cl. .................................... 76/107 C; 83/123; 83/451; 83/510; 83/684
[58] Field of Search .................................. 83/510–512, 83/684, 685, 652–657, 451, 123–128; 76/107 C

[56] References Cited

U.S. PATENT DOCUMENTS

| 643,767 | 2/1900 | Hartman | 83/511 |
| 2,885,913 | 5/1959 | Lescallette | 83/685 X |
| 2,993,421 | 7/1961 | Phillips | 76/107 C |
| 3,166,968 | 1/1965 | Krouskop | 76/107 C |
| 3,397,599 | 8/1968 | Burkhart | 83/685 X |
| 3,698,028 | 10/1972 | Panter et al. | 83/652 X |
| 4,052,886 | 10/1977 | Buick | 76/107 C |
| 4,096,775 | 6/1978 | Thomsen | 83/511 |
| 4,223,684 | 9/1980 | Boogers | 83/510 X |

FOREIGN PATENT DOCUMENTS 1494155 6/1967 France ................................. 83/567

Primary Examiner—James M. Meister
Attorney, Agent, or Firm—Diller, Ramik & Wight

[57] ABSTRACT

A cutting die assembly for cigar wrappers is manufactured by rigidly interconnecting a knife blade unit and a die assembly on a common carrier. The die assembly has an opening of particular shape bounded by a generally planar margin over which tobacco leaf may be draped. The knife unit is formed by shaping knife blade strip into a closed form to fit just inside the shaped margin of the die assembly with the knife edge just above same. The shaped knife blade strip is filled with a filling body interiorally to a height substantially below the cutting edge and is internally rigidified thereby. A suction air chamber is defined by the rigidly interconnected units and is bounded by the common carrier, the die assembly and the outer surface of the knife blade strip. Openings are provided through the margin of the die assembly to the suction air chamber to hold the draped tobacco leaf and stretch it over the knife edge. An expelling plunger is provided within the shaped knife blade strip and suction air passages are formed through the filling body and the plunger to hold tobacco leaf firmly against the cutting edge. The knife blade strip may take the form of plural strips interconnected to form adjacent die cavities.

3 Claims, 7 Drawing Figures

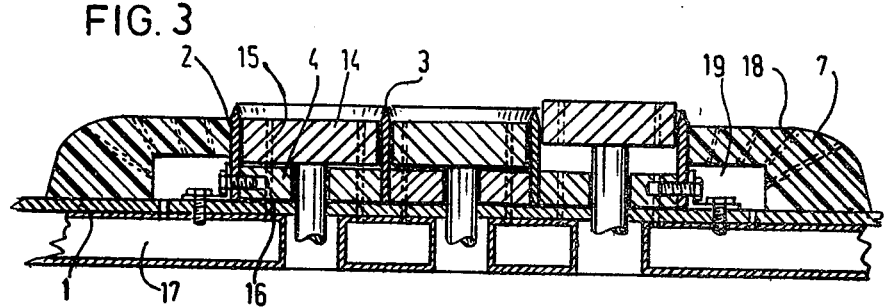
FIG. 3
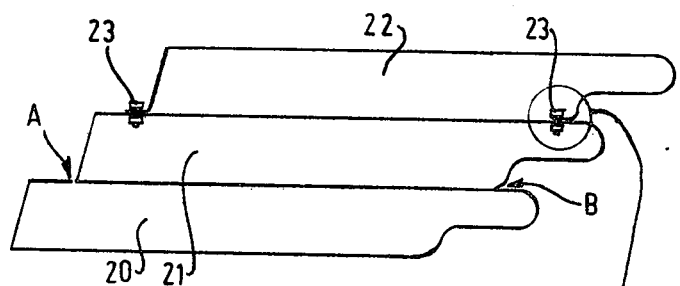
FIG. 4
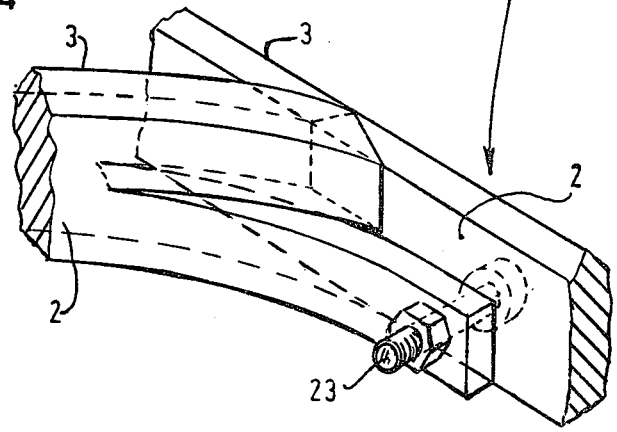

METHOD FOR MANUFACTURING A PUNCHING UNIT

The invention relates to a method of manufacturing a punching unit for simultaneously cutting one or more wrappers from a tobacco leaf.

The invention proposes a method by which a punching unit can be manufactured at low cost, said unit being, in addition, suitable for simultaneously cutting out a large number of wrappers, that is to say, more than by means of the conventional double punching knife. The method according to the invention comprises the characteristic steps of bending a knife blade strip into a closed form corresponding to the wrapper circumference, of arranging a filling body inside the closed form and of arranging the knife form with the enclosed filling body on a carrier.

Such a knife unit can be used on the conventional cutting machines having rolling devices for pressing the knife edge across the tobacco leaf, after which the punched wrappers can be taken up by a leaf carrier and transported to a winding nest or storing belt. The advantage obtained by such a punching unit is that by depositing a single tobacco leaf a large number of wrappers is obtained at the same time, which increases production. Moreover, such a punching unit permits of cutting out different kinds of wrappers in dependence upon the tobacco leaf usually worked in the factory.

In a further development of the method embodying the invention one or more knife blade strips are bent into two or more adjacent, closed forms and/or joined in a complex form. This provides saving of material of the knife blade strip.

The invention furthermore proposes to make the filling body from a curable synthetic resin. The closed form can then be readily filled out with the liquid or kneadable synthetic resin, so that after curing a rigid knife unit is obtained.

The invention furthermore relates to a device comprising a punching unit manufactured by the method described above and a supporting body comprising said punching unit and fastened to the carrier, rolling means adapted to reciprocate above along the supporting body and a leaf pick-up member, said device being distinguished in that the composite knife group can be directed above the level of the rolling means by means of a common expelling member of the carrier.

The invention will be described more fully with reference to some embodiments of punching units.

The drawing shows in

Figure 2:
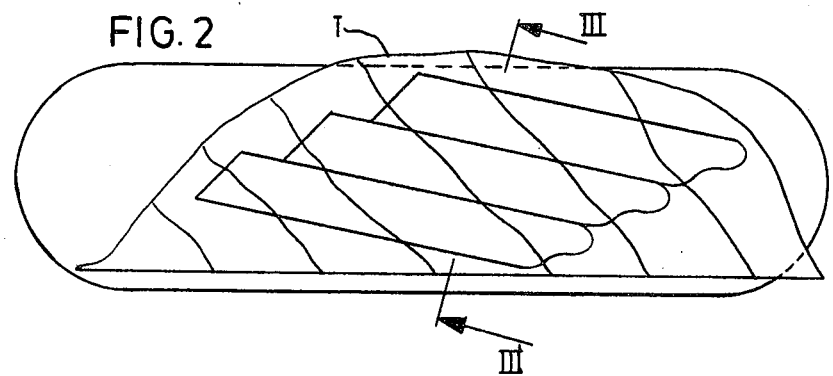
Figure 5:
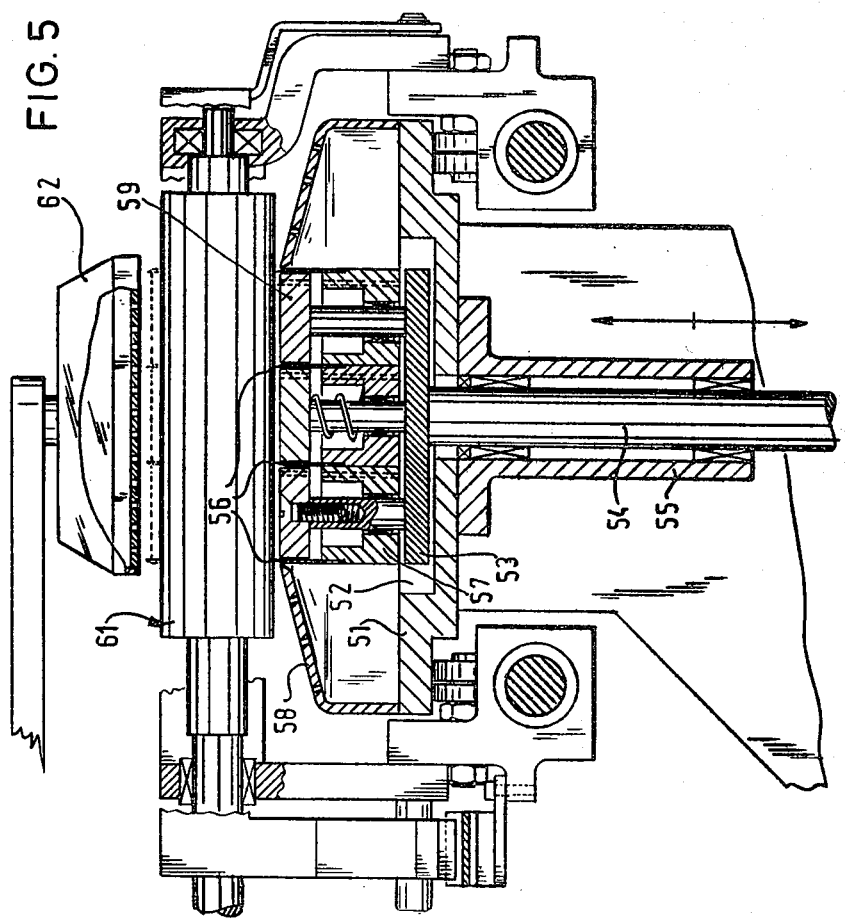
Figure 6:
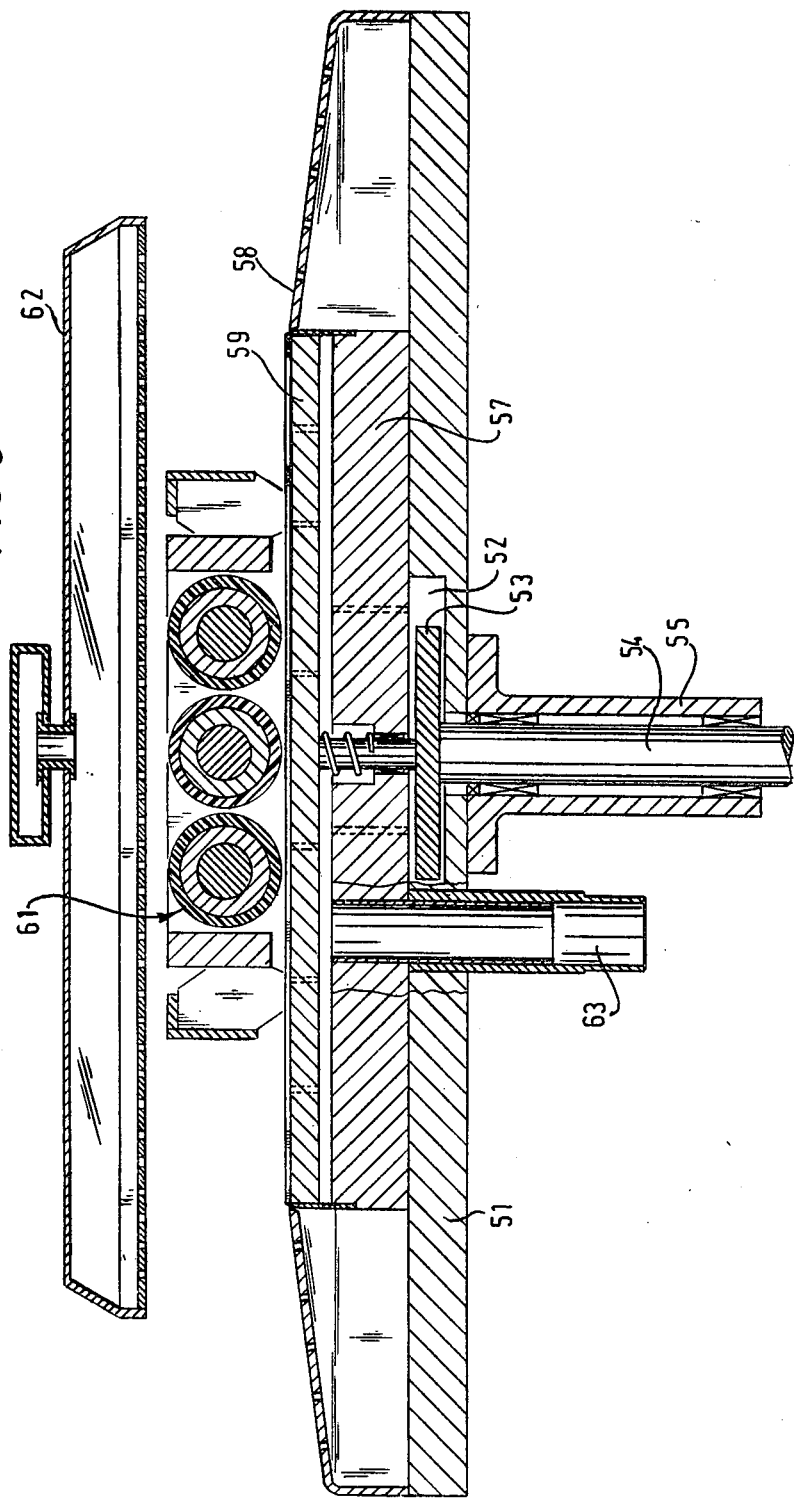
Figure 7:
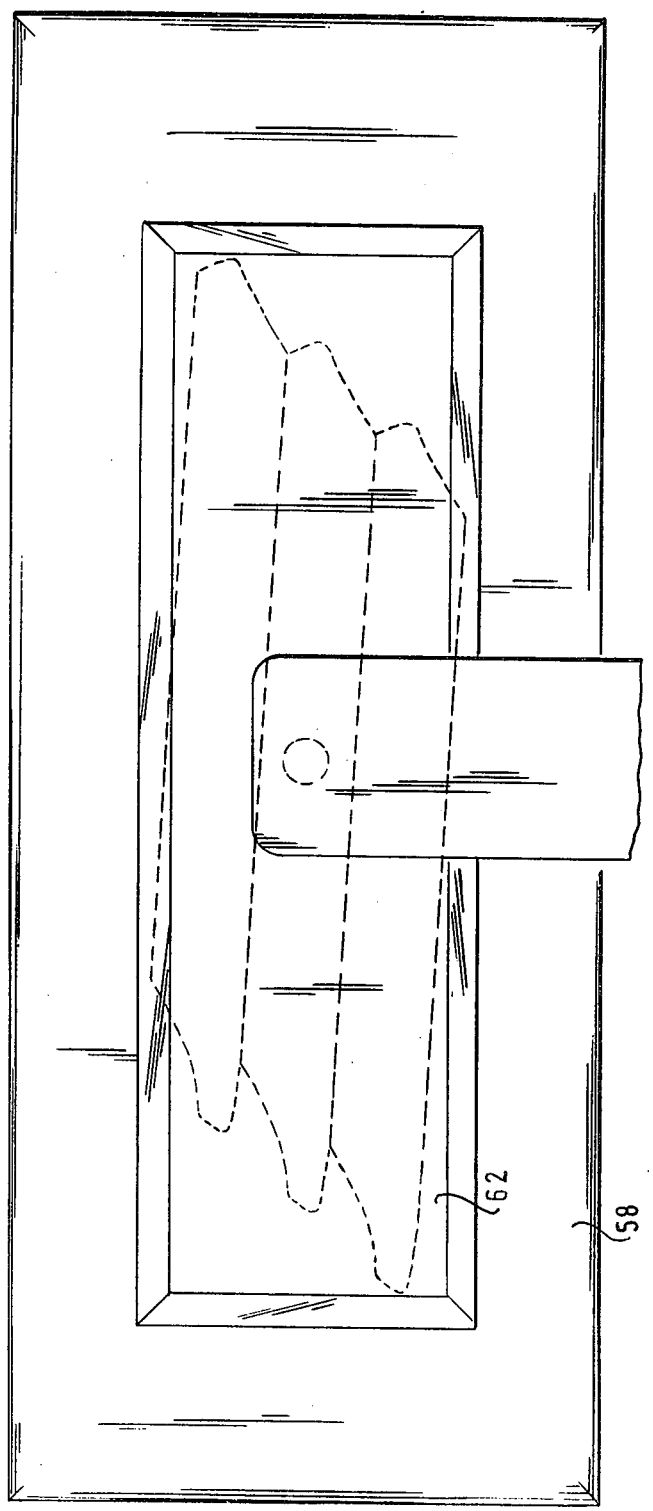

FIG. 1 a perspective plan view of a punching unit arranged on a suction box furthermore provided with a rolling mechanism, and a transport mechanism, FIG. 2 a plan view of a different embodiment of a punching unit, FIG. 3 a sectional view taken on the line III—III in FIG. 1, FIG. 4 a mode of assembling blade strips to form a punching unit, FIG. 5 a sectional view like FIG. 3 of a second embodiment of a device provided with a composite knife group in accordance with the invention, FIG. 6 a vertical sectional view taken on the line VI—VI in FIG. 5, FIG. 7 a plan view of the device of FIGS. 5 and 6.

Referring to FIG. 1, reference numeral 1 designates a carrier on which a plurality of knives 2 are arranged in the form of a cigar wrapper to be cut out of a tobacco leaf. The array of the knife group corresponds to the average, optimum cut form of a given tobacco leaf. This array depends on the user's need.

Each knife form is made from a strip, one longitudinal side of which constitutes later the cutting edge 3. By bending over the blade strip the desired shape can be obtained. The inner side of the knife form is filled out with a filling body 4, which provides the rigidity of the cutting knife. After the array of the knife group is determined, each knife group can be fastened with the aid of brackets 5 to the carrier 1, for example, by means of bolts.

The filling body 4 may have any desired height, but it should at any rate remain below the cutting edge 3 of the knife strip 2. Subsequent to fastening of the knife groups to the carrier 1 a supporting body 7 can be secured to the carrier 1 around the knife forms. This supporting body may be made from any material, for example, metal in which the knife forms are milled in accordance with the array of the knife groups. The supporting body 7 may alternatively be made from a curable synthetic resin, which facilitates its disposition.

After the punching unit is arranged in a processing machine, the roller 8 provided in said machine can be rolled in the direction of the arrow P1 along the knife groups so that a tobacco leaf previously deposited on the knife groups is cut along the cutting edges 3.

After this cutting operation a leaf carrier controllably movable in the direction of the arrows P2, P3 and P4 can pick up each cut wrapper from between the knife edges 3 and transfer it to a winding tape 10.

FIGS. 2 and 3 show a different array of the knife group, in which the closed forms are adjacent one another. The knife blades are fastened to one another before being secured to the carrier 1. Each knife form is internally provided with a filling body 4 of appropriate material, which has a solid part having a small height as compared with the knife blade 2. The remaining space inside the knife blade is filled out by an expelling plunger, the circumference of which corresponds with the inner circumference of the knife form. The expelling plunger 14 is pushed upwards by means not shown out of the knife form in order to facilitate the removal of the cut wrapper.

Each plunger 14 has a continuous hole 15 communicating with a continuous hole 16 in the filling body 4 opening out on the underside near a perforation in the carrier plate 1. By means of suction boxes 17 on the underside of the perforated plate 1 vacuum can be obtained below the tobacco leaf T deposited on the knife group (see FIG. 2).

The supporting body 7 arranged around the knife group also has continuous channels 18, which communicate through an air chamber 19 and the perforated plate 1 with the suction box 17. It is thus possible to deposit in conventional manner half a tobacco leaf T in stretched state on the knife group.

FIG. 4 illustrates a mode of assembling a knife group by a small amount of material. The lower two forms 20 and 21 are composed from one knife blade starting at A and terminating at B. Thus the partition between the knife forms 20 and 21 is formed by a single blade strip, which has a material saving effect. The next-following blade form 22 can be made from a suitably curved blade strip, which is open on one side and can be secured by bolts 23 or the like to the preceding form 21. The cutting edge 3 of each knife blade adjoins the cutting edge of the preceding form (see the encircled detail of the connection in FIG. 4).

FIGS. 5, 6 and 7 show a second embodiment of a punching device in which the carrier 51 has a central recess 52 receiving a common expelling member 53 with a slight freedom of movement in a vertical sense. The expelling member 53 is connected with a rod 54, which can be moved up and down in a vertical sense by means not shown. The rod is guided in a hub 55 arranged on the underside of the carrier plate 51. The plate 51 carries the punching unit manufactured in accordance with the invention consisting of the knife blades 56 curved into the desired form and holding a filling body 57. In the embodiment shown three knife blades are united in a group, in which the filling bodies 57 are interconnected on the underside of the knife blade. The filling bodies 57 bear on the top surface of the carrier 51. Around the knife group is arranged a supporting body 58, which is rigidly secured to the carrier plate 51.

As is shown in FIG. 3, an expelling plunger 59 is arranged inside each knife blade 56, said plunger being directly connected by means of a pin 60 with the expelling member 53.

The common expelling member 53 has for its object to permit of lifting the punching unit as a whole from the carrier 51 to a height such that the cutting edges of the knife blades can move above the level of the cutting roller group 61, which is guided in a reciprocatory manner above and along the supporting body 58. Each time after the roller group 61 has passed by and the tobacco leaf deposited on the punching unit is pressed onto the cutting edges so that three wrappers are punched from the tobacco leaf, this arrangement permits of moving the knife group upwards, subsequent to which the leaf pick-up member 62 can lift the punched tobacco leaf portions from the punching unit. The leaf pick-up member may already be in the pick-up position when the roller group 61 rolls along the cutting edges so that after the upward push of the punching unit immediate removal is ensured, which appreciably shortens the working cycle of the machine.

Owing to the direct connection of the expelling plunger 59 with the common expelling member 53 and owing to the freedom of movement of the expelling plunger 59 in the knife groups or of the common expelling member 53 in the space 52 of the carrier plate 51 the expelling plunger 59 will be in the retracted position when the tobacco leaf is being cut, so that cutting takes place without problems, whilst during the upward movement of the expelling member 53 the expelling plunger 59 itself will move as far as above the cutting edges so that undisturbed removal of the cut tobacco leaves by means of the leaf pick-up member 62 is ensured.

In a similar manner as shown in FIGS. 2 and 3 the expelling plunger 59 has perforations as well as the supporting body 58 in order to obtain sufficient subatmospheric pressure beneath the tobacco leaf to be processed, said perforations communicating through connecting stubs 63 to be connected with an exhaust member.

As a matter of course, the invention is not limited to the embodiments described above.

I claim:

1. The method of manufacturing a cutting die assembly for tobacco leaf, which comprises the steps of:
   (a) providing a die assembly having a supporting body having an opening of particular shape and a surrounding, generally horizontal planar margin over which tobacco leaf may be draped,
   (b) bending knife blade strip to form at least one die cavity of said particular shape and with outer surfaces of the strip engaged against those portions of the supporting body defining said opening, said strip projecting slightly above said planar margin to define a die cutting edge parallel thereto,
   (c) rigidifying said die cavity by filling same with a filling body within the die cavity to a height substantially below said die cutting edge,
   (d) rigidly interconnecting the components of steps (a)–(c) by securement to a common carrier,
   (e) providing a suction air chamber bounded by said carrier, said supporting body and said die cavity,
   (f) providing openings through said margin to said suction air chamber whereby to hold tobacco leaf thereagainst and stretched over said cutting edge,
   (g) providing a movable expelling plunger in said die cavity above said filling body but normally lying below said cutting edge, and
   (h) providing suction air passages through said filling body and said plunger to hold tobacco leaf firmly on said cutting edge.

2. A method as claimed in claim 1 characterized in that one or more knife blade strips are curved into two or more adjacent, closed forms.

3. A method as claimed in claim 1 or 2 characterized in that the filling body is made from a curable synthetic resin.

* * * * *